US009518676B2

(12) United States Patent
Feinauer et al.

(10) Patent No.: US 9,518,676 B2
(45) Date of Patent: Dec. 13, 2016

(54) DEVICE FOR INDICATING THE POSITION OF A VALVE SPINDLE

(71) Applicant: Buerkert Werke GmbH, Ingelfingen (DE)

(72) Inventors: Markus Feinauer, Braunsbach (DE); Christof Jacob, Ohringen (DE)

(73) Assignee: BUERKERT WERKE GMBH (DE)

( * ) Notice: Subject to any disclaimer, the term of this patent is extended or adjusted under 35 U.S.C. 154(b) by 29 days.

(21) Appl. No.: 14/065,734

(22) Filed: Oct. 29, 2013

(65) Prior Publication Data

US 2014/0116542 A1 May 1, 2014

(30) Foreign Application Priority Data

Oct. 30, 2012 (DE) .................... 20 2012 010 469 U

(51) Int. Cl.
*F16K 37/00* (2006.01)
(52) U.S. Cl.
CPC ...... *F16K 37/0041* (2013.01); *Y10T 137/8242* (2015.04)
(58) Field of Classification Search
CPC .................................................. F16K 37/0041
USPC ........................... 137/553, 554; 251/63, 63.5
See application file for complete search history.

(56) References Cited

U.S. PATENT DOCUMENTS

| | | | | |
|---|---|---|---|---|
| 4,582,082 A | * | 4/1986 | Tosseghini | ..................... 137/270 |
| 4,805,451 A | * | 2/1989 | Leon | ................................ 73/168 |
| 5,469,737 A | * | 11/1995 | Smith et al. | ..................... 73/168 |
| 5,570,015 A | * | 10/1996 | Takaishi et al. | ......... 324/207.21 |
| 5,988,524 A | * | 11/1999 | Odajima et al. | ............... 239/119 |
| 6,386,229 B1 | * | 5/2002 | Morikawa et al. | ........... 137/552 |
| 7,207,351 B2 | | 4/2007 | Hayashi et al. | .............. 137/554 |
| 7,490,625 B1 | * | 2/2009 | Johnson et al. | ......... 137/596.16 |
| 7,940,189 B2 | * | 5/2011 | Brown | .......................... 340/621 |
| 2009/0139587 A1 | * | 6/2009 | Spliethoff et al. | ............. 137/554 |
| 2010/0084029 A1 | | 4/2010 | Lin et al. | ...................... 137/553 |
| 2010/0294373 A1 | * | 11/2010 | Haller et al. | ...................... 137/1 |
| 2013/0153036 A1 | * | 6/2013 | Young et al. | ..................... 137/1 |

FOREIGN PATENT DOCUMENTS

| | | | | |
|---|---|---|---|---|
| CN | 1815069 | 8/2006 | ............... | F16K 1/00 |
| CN | 101943291 | 1/2011 | ............... | F16K 1/36 |
| CN | 102177377 | 9/2011 | ............. | F16K 37/00 |

(Continued)

OTHER PUBLICATIONS

Chinese Office Action (w/translation) issued in application No. 201310522160.8, dated Aug. 23, 2016 (19 pgs).

*Primary Examiner* — Craig Schneider
*Assistant Examiner* — Angelisa L Hicks
(74) *Attorney, Agent, or Firm* — Hayes Soloway P.C.

(57) ABSTRACT

Provision is made of a device for indicating the position of a valve spindle of a valve. The device comprises a valve spindle which can be shifted between a first position and a second position, and a sensor module for detecting at least the end positions of the valve spindle. The device further comprises at least a first optical display element (58), preferably a first LED, for indicating the first position, and a second optical display element (60), preferably a second LED, for indicating the second position. A first end position indication (66) is assigned to the first display element (58) and a second end position indication (68) is assigned to the second display element (60).

11 Claims, 2 Drawing Sheets

(56) References Cited

FOREIGN PATENT DOCUMENTS

| CN | 102227582 | 10/2011 | ................ F01L 9/04 |
| CN | 102494184 | 6/2012 | ............. F16K 37/00 |
| DE | 1152584 B | 8/1963 | |
| DE | 2147000 B | 5/1974 | |
| DE | 3819114 A1 | 12/1989 | |
| WO | 9008943 A1 | 8/1990 | |
| WO | WO2010135296 | 11/2010 | ............. F16K 37/00 |

\* cited by examiner

DEVICE FOR INDICATING THE POSITION OF A VALVE SPINDLE

CROSS REFERENCE TO RELATED APPLICATION

This application claims the priority of German Patent Application No. 20 2012 010 469.1, filed on Oct. 30, 2012 in the European Intellectual Property Office, the disclosure of which is incorporated herein in its entirety by reference.

The invention relates to a device for indicating the position of a valve spindle of a valve.

Valves are frequently installed in large systems in the automation industry. For various reasons, such as in the event of maintenance for example, situations occur in which a process has to be interrupted, in which case such valves should be reliably closed and any media flows blocked. Here, a position indication is helpful which allows users to see if the valve is in an open or closed state.

Various devices for indicating the position of valves are known in the prior art.

Simple mechanical position indications frequently indicate only the "open" or "closed" state of a valve. This means that, for instance, the end of the valve spindle appears in a window if the valve spindle is in its upper end position. If the valve spindle is in its lower end position, the window stays empty. This kind of position indication is difficult to identify in some cases, and the state of the valve cannot be determined unequivocally.

The problem of reliably detecting the state of a valve is aggravated in that there are various valve types with different principles of operation. This is why the upper spindle end position is not always equivalent to the valve state "open" and, similarly, the lower spindle end position does not always represent the state "closed". The opposite might also be the case, so that this type of position indication is not unambiguous.

Therefore, other position indications use optical solutions with multi-colored LEDs. It is the valve state which usually is indicated: If the valve is closed, a yellow LED lights up for example, and if the valve is open, a green LED lights up.

The association of color and valve state is implemented in various ways, as desired by the customer, and it is not possible to define a unique association due to the different operating principles of the valves. This is the reason why this kind of position indication, to be more precise valve state indication, may result in errors which may have serious consequences in process automation.

Moreover, it is expensive for manufacturers to provide the different designs desired by customers.

Therefore, it is the object of the invention to provide a position indication which is not dependent on the valve state, is unambiguous, not prone to failure and, further, can be implemented at low cost.

The object is achieved with a device according to claim 1.

A device according to the invention for indicating the position of a valve spindle of a valve comprises a valve spindle which can be shifted between a first position and a second position, a sensor module for detecting at least the end positions of the valve spindle, and at least a first optical display element, preferably a first LED, for indicating the first position, and a second optical display element, preferably a second LED, for indicating the second position, in which a first end position indication is assigned to the first display element and a second end position indication is assigned to the second display element. Here, it is advantageous if both the display elements and the end position indications relate solely to the position of the valve spindle and not to valve states. An indication is made that the valve spindle has reached its first or its second end position, i.e. an upper or lower position, for example. These spindle positions, however, are not assigned to a valve state "open" or "closed". This means that these devices are independent of the various possible valve types.

The device is also independent of the type of drive unit and can be used in both linear drives and rotary drives.

The association between the first and second end position indications and the spindle positions may be effected, for instance, by means of defined locations of the end position indications on the device.

Due to the fact that the device according to the invention for indicating the position is provided with display elements as well as with end position indications, the first and second display elements, in particular two LEDs emitting light with the same wavelength, may be identical in an advantageous embodiment. In that case, differentiation is made by different end position indications. The use of identical LEDs prevents any unintentional mix-up during the assembly process, and the production costs are lower as the purchase price usually decreases with larger quantities.

In one embodiment, the first and second optical display elements are arranged exteriorly on a housing part or within a housing part of the valve. An exterior arrangement on a housing part can be realized with less effort. If the display elements are arranged within a housing part, they are protected by the housing part against possible damage through mechanical or any other external influences. Moreover, the arrangement within a housing part allows for a more compact construction.

In one embodiment, the first and second display elements are arranged on a printed circuit board. In particular, the display elements are installed on said printed circuit board in combination with the sensor module. This has the advantage that the two display elements are arranged in close proximity to the sensor module, whereby a short and simple signal transmission between the sensor module and the display elements is realized.

It is preferred that the end position indications are formed by transparent or translucent portions of the housing part. Thus, the end position indications are preferably not manufactured as separate parts, but can be integrated into the housing part in a simple manner. It is particularly favorable if the entire housing part consists of a transparent or translucent material, for instance of plastic.

The housing part made of a transparent or translucent material is formed in particular as the lid of a control module or feedback module.

In a further embodiment, the display elements each cooperate with an optical waveguide to direct light to the end position indications. This has the advantage that the display elements and the end position indications can be arranged so as to be spaced from each other and the end position indications are nevertheless clearly visible. The distance between the display elements and end position indications is bridged by the optical waveguide. This means that the location of the end position indications can be selected independently of the installation position of the display elements.

The end position indications are preferably arranged on the outer side of the housing part, and the light emitted by the display elements arranged within the housing part shines through them. This can be realized in a particularly simple manner if the display elements are arranged e.g. as LEDs within the housing, which light up when an end position is reached and shine right through the housing; then, the end position indications can be seen as illuminated areas on the outer side of the housing.

The outer side of the housing, comprising the end position indications, may be implemented as a side surface or an end surface of the housing part.

In a further embodiment, an additional identification means is assigned to each of the end position indications, whereby the end position indications are not required to be arranged on predetermined positions of the housing part. Therefore, the assignment of the end position indications to the spindle positions is achieved with the aid of the additional identification means.

The identification means are implemented preferably in the form of labels. Possible candidates for suitable labels are words or abbreviations describing the spindle end position, such as "TOP" for the upper spindle end position and "BOT" (abbreviation of "BOTTOM") for the lower spindle end position. Other labels are also conceivable, of course. The crucial point is that the identification means relate in an unambiguous manner to the spindle end positions and not to the valve states "open" and "closed". This measure avoids undesired mistakes, reading errors and hence risks.

Advantageously, the sensor module and the display elements are arranged within a separate cup-shaped housing module which is placed on the valve and in which the spindle is movably guided. With this, the device for indicating the position is designed as a module, a single module being appropriate for several different valves which differ from each other e.g. in terms of their dimensioning regarding the throughput. Here, it must be ensured that the different valves all have uniform interfaces for their connection to the housing module, or suitable adapters have to be provided.

The modular construction facilitates the exchangeability and maintenance of defective units.

The outer side of the housing part, on which the illuminated portions are arranged, is formed by an end face of the housing module opposite the valve. This has the advantage that the illuminated portions can be clearly seen even if several valves are arranged in a system side by side in a row. Alternatively, it is also possible to arrange the illuminated portions on a side surface, of the housing module, adjoining the valve.

The housing module is in particular made from plastic, the identification means being directly molded in the plastic preferably by injection molding technology. This allows the manufacture of the identification means in a single operation during the production of the housing module. Moreover, good legibility is ensured throughout the service life of the housing module.

However, the identification means can also be printed on the outer or inner side of the housing module or applied by means of laser techniques.

The housing module has its end face provided with an at least partially transparent protuberance; a spindle end projects into said protuberance at least in an end position. The protuberance may directly merge into in the housing module. If the housing module is produced as a transparent component as a whole, it is not necessary to manufacture the end position indications and the protuberance from a material different from that of the remaining housing module.

If a non-transparent housing module is desired, it is possible to form only the end position indications and the protuberance of a transparent or translucent material, for instance, as a window and a hood.

The transparent protuberance and the spindle end constitute a second position indication which is formed independently of the sensor module. If the spindle end comes into view in the transparent protuberance, an end position is reached. Here, the spindle end may be provided with a noticeable, preferably colored marking so as to make the end position clearly visible.

With the integration of the second position indication, the device for indicating the position advantageously turns into a redundant system: If the end position indication, based on the sensor module and display elements, were to break down undesirably, for instance for lack of any power supply, the second position indication (which works in a purely mechanical manner) would still work independently thereof.

In a preferred embodiment, the sensor module is implemented as a path length measuring system. The prior art knows path length measuring systems which are based on different measuring principles, for instance inductive, optical or magnetic ones.

Further advantages of the invention will be exemplarily described below in detail on the basis of the drawings in which.

Figure 1:
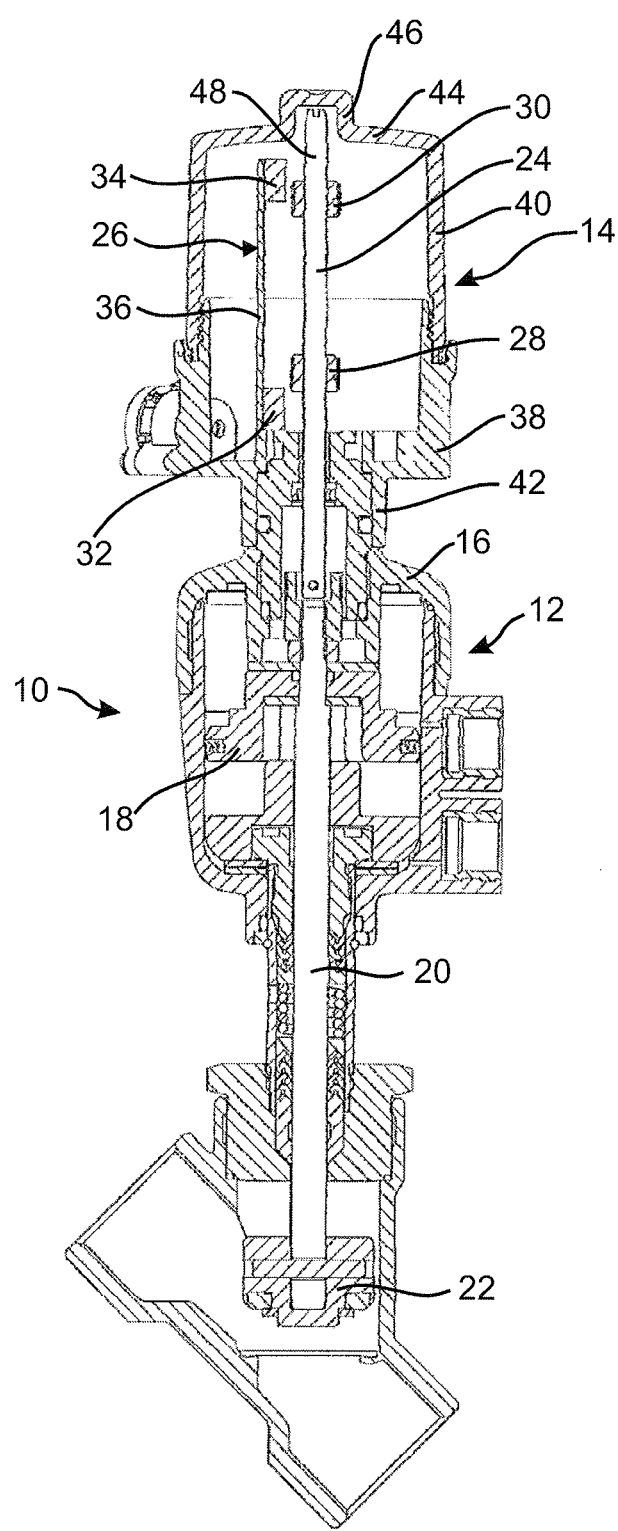
FIG. 1 shows a cross-section through a valve comprising a device according to the invention for indicating the position.

FIG. 1 shows a valve 10 comprising a valve drive 12 and a feedback unit 14 mounted on the end face of the valve drive 12. The valve drive 12 comprises an end wall 16 on which the feedback unit 14 is mounted.

The feedback unit 14 may be designed as a pure feedback module or as a control module.

A piston 18 is connected to a valve spindle 20 moving a valve element 22 which is movably arranged with respect to a valve seat in reversible and linear manner to realize the valve states "open" and "closed".

The valve spindle 20 is connected to a spindle extension 24 projecting through the end wall 16 into the feedback unit 14. It would also be possible to provide a coupling element between the valve spindle 20 and the spindle extension 24, or the spindle extension 24 is omitted and the valve spindle 20 projects into the feedback unit 14.

The feedback unit 14 comprises a sensor module 26 for detecting the position of the valve spindle 20, which is preferably designed as a path length measuring system.

Provided on the spindle extension 24 are a first marking 28 and a second marking 30. Here, they are implemented as sleeves which are fixed to the spindle extension. As an alternative, it would also be possible to use altered cross-sections of the spindle extension 24, applied materials with different characteristics (e.g. magnetic layers) or any other configurations.

For the purpose of detecting the position of the valve spindle 20, the sensor module 26 comprises a first detector 32 and a second detector 34, as well as a printed circuit board 36 carrying the detectors 32 and 34. The detectors 32, 34 are assigned to the markings of the spindle extension 24 and are capable of detecting the presence of the markings 28, 30 vis-à-vis the respective detectors.

In this arrangement, the markings 28 and 30 are arranged on the spindle extension 24 so as to be spaced from each other in the direction of motion of the spindle 20. They are fastened to the spindle extension 24 e.g. by means of a set screw or an adhesive and move together with it when the valve spindle 20 and hence the spindle extension 24 are axially moved.

Preferably, the printed circuit board 36 has its plane arranged parallel to the spindle axis and is supported with appropriate orientation in the feedback unit 14, adjacent to the spindle extension 24.

The detectors 32 and 34 are assigned to the markings 28 and 30 and positioned on the printed circuit board 36 in such a manner that the first detector 32 detects a first spindle end position if the first marking 28 is opposite to it, and the second detector 34 detects a second spindle end position if the second marking 30 is opposite to it.

The feedback unit 14 further comprises a housing including a base part 38 and a cover part 40 which is formed as a cup-shaped housing module. The base part 38 and the cover part 40 are detachably connected to each other, in particular screwed to each other, and form a receiving space for the spindle extension 24 and the sensor module 26.

The base part 38 is opposite the end wall 16 of the valve drive 12 and has an opening 42 through which the spindle extension 24 projects.

The cover part 40 comprises a protuberance 46 at an end face 44 opposite the end wall 16 of the valve drive 12, said protuberance preferably being made of a transparent or translucent material.

The protuberance 46 may be formed as a separate part, for instance as a hood which is inserted in a recess in the end wall 44 of the cover part 40.

It is also possible, however, to provide the cover part 40 along with the integrated protuberance 46 as a component part and to manufacture it entirely from a transparent or translucent material.

In particular, a plastic material may be selected for the transparent or translucent material.

FIG. 1 illustrates the valve spindle in one of two possible end positions, namely in the upper end position: The marking 30 is opposite the detector 34 and a spindle end 48 of the spindle extension 24 projects into the protuberance 46 of the cover part 40. As the protuberance 46 is designed as a transparent part, the spindle end 48 is visible from outside and serves as an end position detecting means.

The device for indicating the position according to the invention will be described in detail below on the basis of the perspective exploded view according to FIG. 2.

Figure 2:
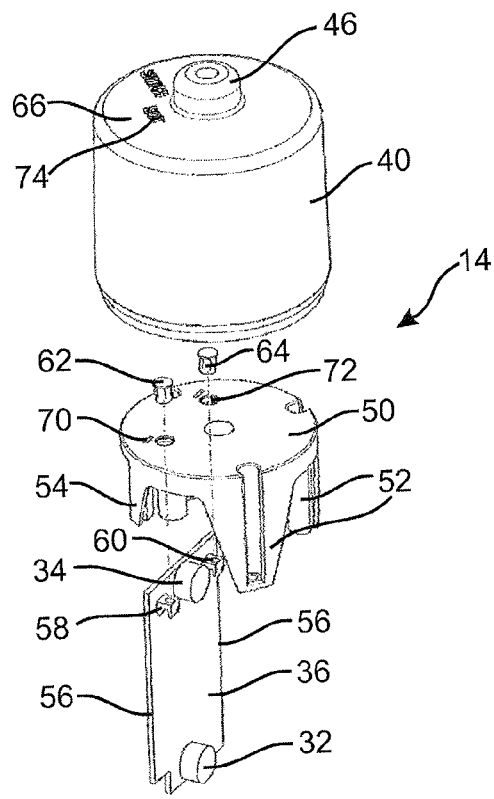
FIG. 2 is a perspective exploded view of the device for indicating the position according to FIG. 1.

The feedback unit 14 substantially comprises the cover part 40 including the protuberance 46, a supporting element 50, the printed circuit board 36 including the detectors 32 and 34, as well as the base part 38 (not shown in FIG. 2).

The supporting element 50 is fastened to the base part 38 with mounting means 52.

Further mounting means 54 hold the printed circuit board 36 on the supporting element 50. The mounting means 54 may comprise rails, for instance, and edges 56 bordering the printed circuit board 36 are pushed into said rails and retained therein in a defined position.

Arranged on the printed circuit board 36 are first and second optical display elements 58, 60, which are preferably implemented in the form of two LEDs. The first display element 58 cooperates with the first detector 32 and the second display element 60 cooperates with the second detector 34.

The two display elements 58, 60 could also be arranged outside on the housing, both on the cover part 40 and on the base part 38. The only important point is that they cooperate with the detectors 32, 34 assigned to them.

Figure 3:
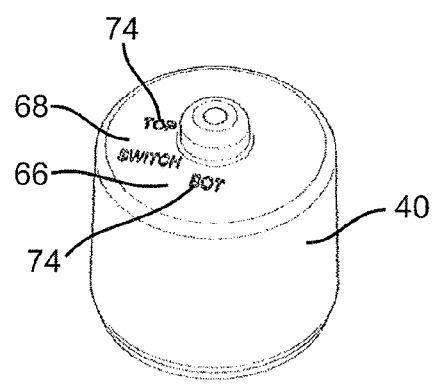
FIG. 3 is a perspective illustration of the device according to FIG. 2.

Each of the display elements 58, 60 has an allocated optical waveguide 62, 64, directing light from the display element to end position indications 66, 68 (see also FIG. 3).

This has the advantage that the display elements 58, 60 need not be adjacent to each other, rather, they can be spaced from each other.

The optical waveguides 62, 64 are inserted through openings 70, 72 in the supporting element 50. In this arrangement, two opposing side surfaces of the optical waveguides 62, 64 and of the display elements 58, 60 adjoin each other such that light emitted from the display elements 58, 60 is coupled into the optical waveguides 62, 64.

The optical waveguides 62, 64 each have its side surface arranged just below the outer side of the cover part 40 and send light through it, so that the end position indications 66, 68 occur as illuminated areas on the outer side of the cover part 40.

The illuminated areas are implemented by transparent or translucent portions in the cover part 40. As an alternative, the entire cover part 40 may be configured so as to be transparent or translucent.

An additional identification means 74, 76, in particular in the form of labels, is assigned to each of the end position indications 66, 68.

The identification means 74, 76 are preferably molded into the cover part 40, e.g. by means of injection molding techniques. It goes without saying, however, that any other methods such as printing or laser technologies may be used for applying the identification means 74, 76 to the interior or exterior of the cover part 40.

Suitable labels are words or abbreviated words describing the end position indications 66, 68 of the spindle 20. Any words such as "TOP" and "BOT", "upper" and "lower" (end) or "up" and "down" are suitable, for example. As an alternative, using symbols is also possible, for instance an arrow pointing downward and another one pointing upward.

The identification means 74, 76 provide for unambiguous assignment between the end position indications 66, 68 and the respective end positions of the spindle 20. This has the advantage that an erroneous reading of the end position indications 66, 68 is virtually impossible and the display elements 58, 60 can be implemented in identical design, for instance as two LEDs emitting light with the same wavelength.

In spatial terms, the identification means 74, 76 can either be arranged next to the end position indications 66, 68 or even coincide with these. In that case, the identification means 74, 76 are backlit, so to speak, when the spindle end positions are reached.

It goes without saying that further labels may be arranged on the cover part.

In the following, the functional principle of the device for indicating the position of the valve spindle 20 will be described.

In a first spindle end position, the first marking 28 is adjacent to the first detector 32. The detector 32, which has the first optical display element 58 assigned to it, activates the latter, i.e. the first LED lights up. The light emitted by the first display element 58 is directed via the optical waveguide 62 to the outer side of the cover part 40, with the cover part being traversed by light. This is why the first end position indication 74 is formed on the outer side of the cover part 40 and occurs as an illuminated portion on the outer side of the cover part 40. This illuminated portion, the first end position indication 74, is additionally labeled with the identification means "BOT". Thus, the first end position indication 74 corresponds to the first (the lower) spindle end position.

In one embodiment of the valve 10, the valve seat would be closed in the first spindle end position. In other embodiments, however, the valve seat could also be open in the first spindle end position. The end position indication 74 is only related to the position of the spindle 20 and is independent of the state of the valve seat, whether "opened" or "closed".

In a second spindle end position which, corresponding to the embodiment according to FIG. 2, is achieved by actuating the valve drive 12, the second marking 30 is adjacent to the second detector 34. The detector 34 assigned to the second optical display element 60 activates the latter, i.e. the second LED lights up. The light emitted by the second display element 60 is directed via the optical waveguide 64 to the outer side of the cover part 40, and the cover part is traversed by light. This is why the second end position indication 76 is formed on the outer side of the cover part 40 and occurs as an illuminated portion on the outer side of the cover part 40. This illuminated portion, the second end position indication 76, is additionally labeled with the identification means "TOP". Thus, the second end position indication 76 corresponds to the second (the upper) spindle end position.

Thus, the device for indicating the position of the valve spindle may be implemented in redundant fashion with two independent position indications. It may comprise both the position indication according to the invention, working by means of the sensor module 26 and delivering the end position indications 66, 68 via the optical display elements 58, 60, and a mechanical position indication. The mechanical position indication is achieved, as described above, by the spindle end appearing in the transparent protuberance 46 in the cover part 40.

Said second position indication is optional. In a more straightforward embodiment, the cover part 40 is provided without any protuberance 46.

The invention claimed is:

1. A device for indicating a position of a valve spindle of a valve, the device comprising:
   the valve spindle and a spindle extension which are moveable between a first position and a second position;
   first and second markings arranged on the spindle extension so as to be spaced in the direction of motion of the valve spindle;
   a sensor module comprising first and second detectors arranged on a printed circuit board and respectively associated with the first and second markings such that the first detector is configured to detect the first position when the first marking lies opposite thereto and the second detector is configured to detect the second position when the second marking lies opposite thereto;
   at least a first optical display element configured to indicate the first position, and a second optical display element configured to indicate the second position, wherein a first end position indication is assigned to the first optical display element and a second end position indication is assigned to the second optical display element; and
   a cup-shaped housing module secured to the valve, wherein the valve spindle is movably guided in the cup-shaped housing module;
   wherein the sensor module and the first and second optical display elements are arranged within the cup-shaped housing module, and
   wherein the cup-shaped housing module comprises an end face provided with a partially transparent protuberance configured such that an end of the valve spindle projects into the partially transparent protuberance and is visible through the partially transparent protuberance when the valve spindle is in at least one of the first and second positions.

2. The device according to claim 1, wherein the first and second optical display elements are two identical LEDs which are configured to emit light with same wavelength.

3. The device according to claim 1, wherein the cup-shaped housing module comprises the printed circuit board, and the first and second optical display elements are arranged on the printed circuit board.

4. The device according to claim 1, wherein the first and second end position indications include transparent or translucent portions on the end face of the cup-shaped housing module.

5. The device according to claim 4, wherein the first and second optical display elements each cooperates with an optical waveguide in order to guide light to the first and second end position indications.

6. The device according to claim 1, wherein the first and second end position indications are arranged on an outer side of the cup-shaped housing module and are configured to output light from the first and second optical display elements arranged within the housing module.

7. The device according to claim 6, further comprising:
   an additional identification means assigned to each of the first and second end position indications.

8. The device according to claim 7, wherein the additional identification means include labels.

9. The device according to claim 8, wherein the cup-shaped housing module comprises plastic, and the additional identification means are directly molded in the plastic by injection molding.

10. The device according to claim 1, wherein the partially transparent protuberance and the visible end of valve spindle represent a separate position indication formed independently of the sensor module.

11. The device according to claim 1, wherein the sensor module includes a path length measuring system.

* * * * *